US011990682B2

(12) United States Patent
Cai et al.

(10) Patent No.: US 11,990,682 B2
(45) Date of Patent: May 21, 2024

(54) ELECTRONIC DEVICES HAVING TILTED ANTENNA ARRAYS

(71) Applicant: Apple Inc., Cupertino, CA (US)

(72) Inventors: Zhenglian Cai, Cupertino, CA (US); Harish Rajagopalan, San Jose, CA (US); Panagiotis Theofanopoulos, Cupertino, CA (US); Ioannis Pefkianakis, San Jose, CA (US); Prashant H. Vashi, San Jose, CA (US); Guillaume Monghal, San Diego, CA (US); Jennifer M. Edwards, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/541,699

(22) Filed: Dec. 3, 2021

(65) Prior Publication Data

US 2023/0178899 A1 Jun. 8, 2023

(51) Int. Cl.
*H01Q 1/24* (2006.01)
*H01Q 1/22* (2006.01)
*H01Q 1/42* (2006.01)
*H01Q 21/00* (2006.01)

(52) U.S. Cl.
CPC ....... *H01Q 21/0075* (2013.01); *H01Q 1/2283* (2013.01); *H01Q 1/243* (2013.01)

(58) Field of Classification Search
CPC ...... H01Q 1/24; H01Q 1/243; H01Q 21/0075; H01Q 1/22; H01Q 1/2283; H01Q 1/42; H01Q 1/428; H01Q 3/30; H01Q 21/00
See application file for complete search history.

(56) References Cited

U.S. PATENT DOCUMENTS 9,768,491 B2 9/2017 Jin et al.
10,707,558 B2 * 7/2020 Hu ......................... H01Q 1/243
2017/0187106 A1 * 6/2017 Hashimoto ............ H01Q 21/28
(Continued)

FOREIGN PATENT DOCUMENTS

JP 2017118395 A 6/2017
KR 20210128921 A 10/2021
(Continued)

OTHER PUBLICATIONS

U.S. Appl. No. 17/031,775, filed Sep. 24, 2020.

*Primary Examiner* — Thai Pham
(74) *Attorney, Agent, or Firm* — Treyz Law Group, P.C.; Michael H. Lyons

(57) ABSTRACT

An electronic device may be provided with first and second sidewalls, a rear wall, and a display. Multiple antenna panels may be used to convey radio-frequency signals at frequencies greater than 10 GHz. A first antenna panel may radiate through the display while second and third panels radiate through the first and second sidewalls. The second and third panels may be tilted at non-zero angles with respect to the sidewalls. The non-zero angles may be of opposite sign. The non-zero angles may have the same magnitude. The magnitude may be equal to 15 degrees, as one example. Tilting the panels in this way may allow the panels to collectively cover as much of a sphere around the device as possible, including out of coverage areas behind the rear wall caused by conductive material in the rear wall, without requiring additional panels to be disposed within the device.

20 Claims, 12 Drawing Sheets

(56) References Cited

U.S. PATENT DOCUMENTS

| | | | | |
|---|---|---|---|---|
| 2018/0048052 | A1* | 2/2018 | Jin | H01Q 1/48 |
| 2022/0006486 | A1* | 1/2022 | Rajagopalan | H01Q 13/24 |
| 2022/0131265 | A1* | 4/2022 | Cheng | H01Q 3/36 |

FOREIGN PATENT DOCUMENTS

| | | | |
|---|---|---|---|
| WO | 2014151558 | A1 | 9/2014 |
| WO | 2019135856 | A1 | 7/2019 |

* cited by examiner

| PANEL ANGLE | P50 CDF | P5 CDF |
|---|---|---|
| 0° | 23.05 dBm | 9.87 dBm |
| 5° | 23.26 dBm | 14.32 dBm |
| 15° | 23.34 dBm | 12.48 dBm |
| 45° | 22.59 dBm | 11.84 dBm |

*FIG. 12*

ELECTRONIC DEVICES HAVING TILTED ANTENNA ARRAYS

BACKGROUND

This relates generally to electronic devices and, more particularly, to electronic devices with wireless communications circuitry.

Electronic devices often include wireless communications circuitry. For example, cellular telephones, computers, and other devices often contain antennas and wireless transceivers for supporting wireless communications.

It may be desirable to support wireless communications in millimeter wave and centimeter wave communications bands. Millimeter wave communications, which are sometimes referred to as extremely high frequency (EHF) communications, and centimeter wave communications involve communications at frequencies of about 10-300 GHz. Operation at these frequencies can support high throughputs but may raise significant challenges. For example, radio-frequency signals at millimeter and centimeter wave frequencies can be characterized by substantial attenuation and/or distortion during signal propagation through various mediums. In addition, conductive electronic device components can make it difficult to provide a full sphere of radio-frequency coverage around the electronic device.

SUMMARY

An electronic device may be provided with wireless circuitry and a housing. The housing may have peripheral conductive housing structures and a rear wall. A display may be mounted to the peripheral conductive housing structures opposite the rear wall. The wireless circuitry may include multiple antenna panels for conveying radio-frequency signals at frequencies greater than 10 GHz.

The antenna panels may include a first antenna panel that radiates through the display. The antenna panels may include a second antenna panel that radiates through a first portion of the peripheral conductive housing structures and a third antenna panel that radiates through a second portion of the peripheral conductive housing structures. The second and/or third antenna panels may be tilted at non-zero angles with respect to the peripheral conductive housing structures. The non-zero angles may be of opposite sign. The non-zero angles may have the same magnitude. The magnitude may be equal to 15 degrees, as one example. Tilting the antenna panels in this way may allow the antenna panels to collectively cover as much of a sphere around the device as possible, including out of coverage areas within the hemisphere behind the rear wall caused by conductive material in the rear wall, without requiring additional antenna panels to be disposed within the device.

BRIEF DESCRIPTION OF THE DRAWINGS

FIG. 12 is a table showing how an illustrative antenna panel may be tilted at different angles to adjust the radio-frequency coverage around an electronic device in accordance with some embodiments.

DETAILED DESCRIPTION

Figure 1:
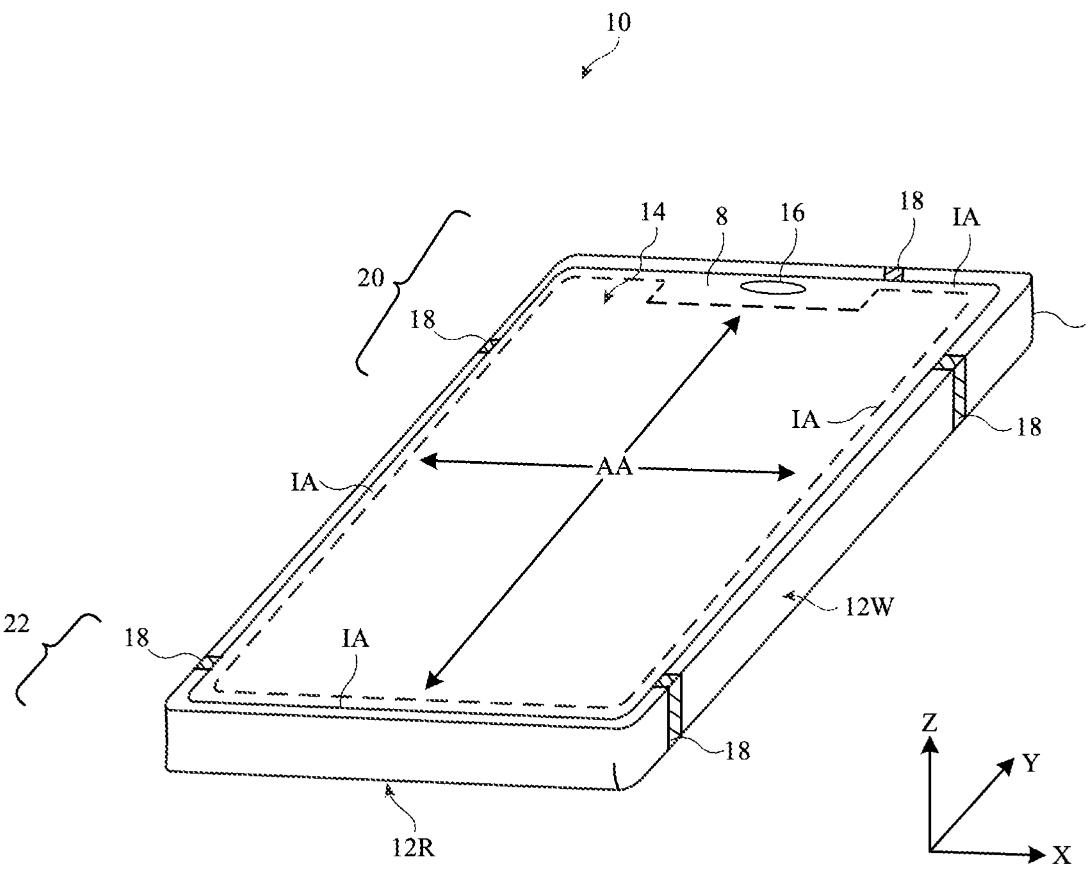
FIG. 1 is a perspective view of an illustrative electronic device in accordance with some embodiments.

An electronic device such as electronic device 10 of FIG. 1 may be provided with wireless circuitry that includes antennas. The antennas may be used to transmit and/or receive wireless radio-frequency signals. The antennas may include phased antenna arrays that are used for performing wireless communications and/or spatial ranging operations using millimeter and centimeter wave signals. Millimeter wave signals, which are sometimes referred to as extremely high frequency (EHF) signals, propagate at frequencies above about 30 GHz (e.g., at 60 GHz or other frequencies between about 30 GHz and 300 GHz). Centimeter wave signals propagate at frequencies between about 10 GHz and 30 GHz. If desired, device 10 may also contain antennas for handling satellite navigation system signals, cellular telephone signals, local wireless area network signals, near-field communications, light-based wireless communications, or other wireless communications.

Device 10 may be a portable electronic device or other suitable electronic device. For example, device 10 may be a laptop computer, a tablet computer, a somewhat smaller device such as a wrist-watch device, pendant device, headphone device, earpiece device, headset device, or other wearable or miniature device, a handheld device such as a cellular telephone, a media player, or other small portable device. Device 10 may also be a set-top box, a desktop computer, a display into which a computer or other processing circuitry has been integrated, a display without an integrated computer, a wireless access point, a wireless base station, an electronic device incorporated into a kiosk, building, or vehicle, or other suitable electronic equipment.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material (e.g., glass, ceramic, plastic, sapphire, etc.). In other situations, housing 12 or at least some of the structures that make up housing 12 may be formed from metal elements.

Device 10 may, if desired, have a display such as display 14. Display 14 may be mounted on the front face of device 10. Display 14 may be a touch screen that incorporates capacitive touch electrodes or may be insensitive to touch. The rear face of housing 12 (i.e., the face of device 10 opposing the front face of device 10) may have a substantially planar housing wall such as rear housing wall 12R (e.g., a planar housing wall). Rear housing wall 12R may have slots that pass entirely through the rear housing wall and that therefore separate portions of housing 12 from each other. Rear housing wall 12R may include conductive portions and/or dielectric portions. If desired, rear housing wall 12R may include a planar metal layer covered by a thin layer or coating of dielectric such as glass, plastic, sapphire, or ceramic (e.g., a dielectric cover layer). Housing 12 may also have shallow grooves that do not pass entirely through housing 12. The slots and grooves may be filled with plastic or other dielectric materials. If desired, portions of housing 12 that have been separated from each other (e.g., by a through slot) may be joined by internal conductive structures (e.g., sheet metal or other metal members that bridge the slot).

Housing 12 may include peripheral housing structures such as peripheral structures 12W. Conductive portions of peripheral structures 12W and conductive portions of rear housing wall 12R may sometimes be referred to herein collectively as conductive structures of housing 12. Peripheral structures 12W may run around the periphery of device 10 and display 14. In configurations in which device 10 and display 14 have a rectangular shape with four edges, peripheral structures 12W may be implemented using peripheral housing structures that have a rectangular ring shape with four corresponding edges and that extend from rear housing wall 12R to the front face of device 10 (as an example). In other words, device 10 may have a length (e.g., measured parallel to the Y-axis), a width that is less than the length (e.g., measured parallel to the X-axis), and a height (e.g., measured parallel to the Z-axis) that is less than the width. Peripheral structures 12W or part of peripheral structures 12W may serve as a bezel for display 14 (e.g., a cosmetic trim that surrounds all four sides of display 14 and/or that helps hold display 14 to device 10) if desired. Peripheral structures 12W may, if desired, form sidewall structures for device 10 (e.g., by forming a metal band with vertical sidewalls, curved sidewalls, etc.).

Peripheral structures 12W may be formed of a conductive material such as metal and may therefore sometimes be referred to as peripheral conductive housing structures, conductive housing structures, peripheral metal structures, peripheral conductive sidewalls, peripheral conductive sidewall structures, conductive housing sidewalls, peripheral conductive housing sidewalls, sidewalls, sidewall structures, or a peripheral conductive housing member (as examples). Peripheral conductive housing structures 12W may be formed from a metal such as stainless steel, aluminum, alloys, or other suitable materials. One, two, or more than two separate structures may be used in forming peripheral conductive housing structures 12W.

It is not necessary for peripheral conductive housing structures 12W to have a uniform cross-section. For example, the top portion of peripheral conductive housing structures 12W may, if desired, have an inwardly protruding ledge that helps hold display 14 in place. The bottom portion of peripheral conductive housing structures 12W may also have an enlarged lip (e.g., in the plane of the rear surface of device 10). Peripheral conductive housing structures 12W may have substantially straight vertical sidewalls, may have sidewalls that are curved, or may have other suitable shapes. In some configurations (e.g., when peripheral conductive housing structures 12W serve as a bezel for display 14), peripheral conductive housing structures 12W may run around the lip of housing 12 (i.e., peripheral conductive housing structures 12W may cover only the edge of housing 12 that surrounds display 14 and not the rest of the sidewalls of housing 12).

Rear housing wall 12R may lie in a plane that is parallel to display 14. In configurations for device 10 in which some or all of rear housing wall 12R is formed from metal, it may be desirable to form parts of peripheral conductive housing structures 12W as integral portions of the housing structures forming rear housing wall 12R. For example, rear housing wall 12R of device 10 may include a planar metal structure and portions of peripheral conductive housing structures 12W on the sides of housing 12 may be formed as flat or curved vertically extending integral metal portions of the planar metal structure (e.g., housing structures 12R and 12W may be formed from a continuous piece of metal in a unibody configuration). Housing structures such as these may, if desired, be machined from a block of metal and/or may include multiple metal pieces that are assembled together to form housing 12. Rear housing wall 12R may have one or more, two or more, or three or more portions. Peripheral conductive housing structures 12W and/or conductive portions of rear housing wall 12R may form one or more exterior surfaces of device 10 (e.g., surfaces that are visible to a user of device 10) and/or may be implemented using internal structures that do not form exterior surfaces of device 10 (e.g., conductive housing structures that are not visible to a user of device 10 such as conductive structures that are covered with layers such as thin cosmetic layers, protective coatings, and/or other coating/cover layers that may include dielectric materials such as glass, ceramic, plastic, or other structures that form the exterior surfaces of device 10 and/or serve to hide peripheral conductive housing structures 12W and/or conductive portions of rear housing wall 12R from view of the user).

Display 14 may have an array of pixels that form an active area AA that displays images for a user of device 10. For example, active area AA may include an array of display pixels. The array of pixels may be formed from liquid crystal display (LCD) components, an array of electrophoretic pixels, an array of plasma display pixels, an array of organic light-emitting diode display pixels or other light-emitting diode pixels, an array of electrowetting display pixels, or display pixels based on other display technologies. If desired, active area AA may include touch sensors such as touch sensor capacitive electrodes, force sensors, or other sensors for gathering a user input.

Display 14 may have an inactive border region that runs along one or more of the edges of active area AA. Inactive area IA of display 14 may be free of pixels for displaying images and may overlap circuitry and other internal device structures in housing 12. To block these structures from view by a user of device 10, the underside of the display cover layer or other layers in display 14 that overlap inactive area IA may be coated with an opaque masking layer in inactive area IA. The opaque masking layer may have any suitable color. Inactive area IA may include a recessed region or notch that extends into active area AA (e.g., at speaker port 16). Active area AA may, for example, be defined by the lateral area of a display module for display 14 (e.g., a display module that includes pixel circuitry, touch sensor circuitry, etc.).

Display 14 may be protected using a display cover layer such as a layer of transparent glass, clear plastic, transparent ceramic, sapphire, or other transparent crystalline material, or other transparent layer(s). The display cover layer may have a planar shape, a convex curved profile, a shape with planar and curved portions, a layout that includes a planar main area surrounded on one or more edges with a portion that is bent out of the plane of the planar main area, or other suitable shapes. The display cover layer may cover the entire front face of device 10. In another suitable arrangement, the display cover layer may cover substantially all of the front face of device 10 or only a portion of the front face of device 10. Openings may be formed in the display cover layer. For example, an opening may be formed in the display cover layer to accommodate a button. An opening may also be formed in the display cover layer to accommodate ports such as speaker port 16 or a microphone port. Openings may be formed in housing 12 to form communications ports (e.g., an audio jack port, a digital data port, etc.) and/or audio ports for audio components such as a speaker and/or a microphone if desired.

Display 14 may include conductive structures such as an array of capacitive electrodes for a touch sensor, conductive lines for addressing pixels, driver circuits, etc. Housing 12 may include internal conductive structures such as metal frame members and a planar conductive housing member (sometimes referred to as a conductive support plate or backplate) that spans the walls of housing 12 (e.g., a substantially rectangular sheet formed from one or more metal parts that is welded or otherwise connected between opposing sides of peripheral conductive housing structures 12W). The conductive support plate may form an exterior rear surface of device 10 or may be covered by a dielectric cover layer such as a thin cosmetic layer, protective coating, and/or other coatings that may include dielectric materials such as glass, ceramic, plastic, or other structures that form the exterior surfaces of device 10 and/or serve to hide the conductive support plate from view of the user (e.g., the conductive support plate may form part of rear housing wall 12R). Device 10 may also include conductive structures such as printed circuit boards, components mounted on printed circuit boards, and other internal conductive structures. These conductive structures, which may be used in forming a ground plane in device 10, may extend under active area AA of display 14, for example.

In regions 22 and 20, openings may be formed within the conductive structures of device 10 (e.g., between peripheral conductive housing structures 12W and opposing conductive ground structures such as conductive portions of rear housing wall 12R, conductive traces on a printed circuit board, conductive electrical components in display 14, etc.). These openings, which may sometimes be referred to as gaps, may be filled with air, plastic, and/or other dielectrics and may be used in forming slot antenna resonating elements for one or more antennas in device 10, if desired.

Conductive housing structures and other conductive structures in device 10 may serve as a ground plane for the antennas in device 10. The openings in regions 22 and 20 may serve as slots in open or closed slot antennas, may serve as a central dielectric region that is surrounded by a conductive path of materials in a loop antenna, may serve as a space that separates an antenna resonating element such as a strip antenna resonating element or an inverted-F antenna resonating element from the ground plane, may contribute to the performance of a parasitic antenna resonating element, or may otherwise serve as part of antenna structures formed in regions 22 and 20. If desired, the ground plane that is under active area AA of display 14 and/or other metal structures in device 10 may have portions that extend into parts of the ends of device 10 (e.g., the ground may extend towards the dielectric-filled openings in regions 22 and 20), thereby narrowing the slots in regions 22 and 20. Region 22 may sometimes be referred to herein as lower region 22 or lower end 22 of device 10. Region 20 may sometimes be referred to herein as upper region 20 or upper end 20 of device 10.

In general, device 10 may include any suitable number of antennas (e.g., one or more, two or more, three or more, four or more, etc.). The antennas in device 10 may be located at opposing first and second ends of an elongated device housing (e.g., at lower region 22 and/or upper region 20 of device 10 of FIG. 1), along one or more edges of a device housing, in the center of a device housing, in other suitable locations, or in one or more of these locations. The arrangement of FIG. 1 is merely illustrative.

Portions of peripheral conductive housing structures 12W may be provided with peripheral gap structures. For example, peripheral conductive housing structures 12W may be provided with one or more dielectric-filled gaps such as gaps 18, as shown in FIG. 1. The gaps in peripheral conductive housing structures 12W may be filled with dielectric such as polymer, ceramic, glass, air, other dielectric materials, or combinations of these materials. Gaps 18 may divide peripheral conductive housing structures 12W into one or more peripheral conductive segments. The conductive segments that are formed in this way may form parts of antennas in device 10 if desired. Other dielectric openings may be formed in peripheral conductive housing structures 12W (e.g., dielectric openings other than gaps 18) and may serve as dielectric antenna windows for antennas mounted within the interior of device 10. Antennas within device 10 may be aligned with the dielectric antenna windows for conveying radio-frequency signals through peripheral conductive housing structures 12W. Antennas within device 10 may also be aligned with inactive area IA of display 14 for conveying radio-frequency signals through display 14.

In order to provide an end user of device 10 with as large of a display as possible (e.g., to maximize an area of the device used for displaying media, running applications, etc.), it may be desirable to increase the amount of area at the front face of device 10 that is covered by active area AA of display 14. Increasing the size of active area AA may reduce the size of inactive area IA within device 10. This may reduce the area behind display 14 that is available for antennas within device 10. For example, active area AA of display 14 may include conductive structures that serve to block radio-frequency signals handled by antennas mounted behind active area AA from radiating through the front face of device 10. It would therefore be desirable to be able to provide antennas that occupy a small amount of space within device 10 (e.g., to allow for as large of a display active area AA as possible) while still allowing the antennas to communicate with wireless equipment external to device 10 with satisfactory efficiency bandwidth.

In a typical scenario, device 10 may have one or more upper antennas and one or more lower antennas. An upper antenna may, for example, be formed in upper region 20 of device 10. A lower antenna may, for example, be formed in lower region 22 of device 10. Additional antennas may be formed along the edges of housing 12 extending between regions 20 and 22 if desired. An example in which device 10 includes three or four upper antennas and five lower antennas is described herein as an example. The antennas may be used separately to cover identical communications bands, overlapping communications bands, or separate communications bands. The antennas may be used to implement an antenna diversity scheme or a multiple-input-multiple-output (MIMO) antenna scheme. Other antennas for covering any other desired frequencies may also be mounted at any desired locations within the interior of device 10. The example of FIG. 1 is merely illustrative. If desired, housing 12 may have other shapes (e.g., a square shape, cylindrical shape, spherical shape, combinations of these and/or different shapes, etc.).

Figure 2:
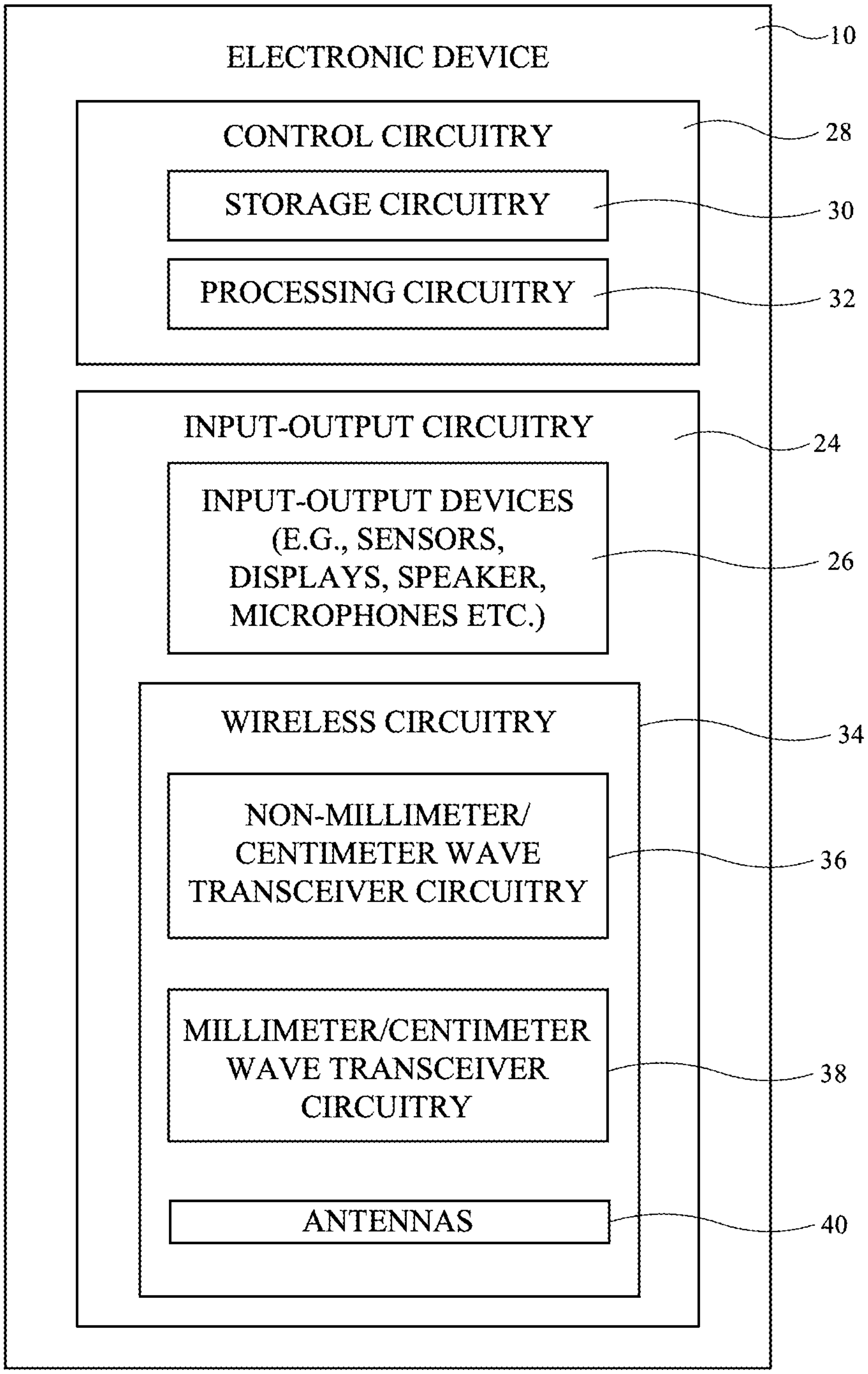
FIG. 2 is a schematic diagram of illustrative circuitry in an electronic device in accordance with some embodiments.

A schematic diagram of illustrative components that may be used in device 10 is shown in FIG. 2. As shown in FIG. 2, device 10 may include control circuitry 28. Control circuitry 28 may include storage such as storage circuitry 30. Storage circuitry 30 may include hard disk drive storage, nonvolatile memory (e.g., flash memory or other electrically-programmable-read-only memory configured to form a solid-state drive), volatile memory (e.g., static or dynamic random-access-memory), etc.

Control circuitry 28 may include processing circuitry such as processing circuitry 32. Processing circuitry 32 may be used to control the operation of device 10. Processing circuitry 32 may include on one or more microprocessors, microcontrollers, digital signal processors, host processors, baseband processor integrated circuits, application specific integrated circuits, central processing units (CPUs), etc. Control circuitry 28 may be configured to perform operations in device 10 using hardware (e.g., dedicated hardware or circuitry), firmware, and/or software. Software code for performing operations in device 10 may be stored on storage circuitry 30 (e.g., storage circuitry 30 may include non-transitory (tangible) computer readable storage media that stores the software code). The software code may sometimes be referred to as program instructions, software, data, instructions, or code. Software code stored on storage circuitry 30 may be executed by processing circuitry 32.

Control circuitry 28 may be used to run software on device 10 such as internet browsing applications, voice-over-internet-protocol (VOIP) telephone call applications, email applications, media playback applications, operating system functions, etc. To support interactions with external equipment, control circuitry 28 may be used in implementing communications protocols. Communications protocols that may be implemented using control circuitry 28 include internet protocols, wireless local area network protocols (e.g., IEEE 802.11 protocols—sometimes referred to as WiFi®), protocols for other short-range wireless communications links such as the Bluetooth® protocol or other WPAN protocols, IEEE 802.11ad protocols, cellular telephone protocols, MIMO protocols, antenna diversity protocols, satellite navigation system protocols, antenna-based spatial ranging protocols (e.g., radio detection and ranging (RADAR) protocols or other desired range detection protocols for signals conveyed at millimeter and centimeter wave frequencies), etc. Each communication protocol may be associated with a corresponding radio access technology (RAT) that specifies the physical connection methodology used in implementing the protocol.

Device 10 may include input-output circuitry 24. Input-output circuitry 24 may include input-output devices 26. Input-output devices 26 may be used to allow data to be supplied to device 10 and to allow data to be provided from device 10 to external devices. Input-output devices 26 may include user interface devices, data port devices, sensors, and other input-output components. For example, input-output devices may include touch screens, displays without touch sensor capabilities, buttons, joysticks, scrolling wheels, touch pads, key pads, keyboards, microphones, cameras, speakers, status indicators, light sources, audio jacks and other audio port components, digital data port devices, light sensors, gyroscopes, accelerometers or other components that can detect motion and device orientation relative to the Earth, capacitance sensors, proximity sensors (e.g., a capacitive proximity sensor and/or an infrared proximity sensor), magnetic sensors, and other sensors and input-output components.

Input-output circuitry 24 may include wireless circuitry such as wireless circuitry 34 for wirelessly conveying radio-frequency signals. While control circuitry 28 is shown separately from wireless circuitry 34 in the example of FIG. 2 for the sake of clarity, wireless circuitry 34 may include processing circuitry that forms a part of processing circuitry 32 and/or storage circuitry that forms a part of storage circuitry 30 of control circuitry 28 (e.g., portions of control circuitry 28 may be implemented on wireless circuitry 34). As an example, control circuitry 28 may include baseband processor circuitry or other control components that form a part of wireless circuitry 34.

Wireless circuitry 34 may include millimeter and centimeter wave transceiver circuitry such as millimeter/centimeter wave transceiver circuitry 38. Millimeter/centimeter wave transceiver circuitry 38 may support communications at frequencies between about 10 GHz and 300 GHz. For example, millimeter/centimeter wave transceiver circuitry 38 may support communications in Extremely High Frequency (EHF) or millimeter wave communications bands between about 30 GHz and 300 GHz and/or in centimeter wave communications bands between about 10 GHz and 30 GHz (sometimes referred to as Super High Frequency (SHF) bands). As examples, millimeter/centimeter wave transceiver circuitry 38 may support communications in an IEEE K communications band between about 18 GHz and 27 GHz, a $K_a$ communications band between about 26.5 GHz and 40 GHz, a $K_a$ communications band between about 12 GHz and 18 GHz, a V communications band between about 40 GHz and 75 GHz, a W communications band between about 75 GHz and 110 GHz, or any other desired frequency band between approximately 10 GHz and 300 GHz. If desired, millimeter/centimeter wave transceiver circuitry 38 may support IEEE 802.11ad communications at 60 GHz (e.g., WiGig or 60 GHz Wi-Fi bands around 57-61 GHz), and/or $5^{th}$ generation mobile networks or $5^{th}$ generation wireless systems (5G) New Radio (NR) Frequency Range 2 (FR2) communications bands between about 24 GHz and 90 GHz. Millimeter/centimeter wave transceiver circuitry 38 may be formed from one or more integrated circuits (e.g., multiple integrated circuits mounted on a common printed circuit in a system-in-package device, one or more integrated circuits mounted on different substrates, etc.).

Millimeter/centimeter wave transceiver circuitry 38 (sometimes referred to herein simply as transceiver circuitry 38 or millimeter/centimeter wave circuitry 38) may perform spatial ranging operations using radio-frequency signals at millimeter and/or centimeter wave frequencies that are transmitted and received by millimeter/centimeter wave transceiver circuitry 38. The received signals may be a version of the transmitted signals that have been reflected off external objects and back towards device 10. Control circuitry 28 may process the transmitted and received signals to detect or estimate a range between device 10 and one or more external objects in the surroundings of device 10 (e.g., objects external to device 10 such as the body of a user or other persons, other devices, animals, furniture, walls, or other objects or obstacles in the vicinity of device 10). If desired, control circuitry 28 may also process the transmitted and received signals to identify a two or three-dimensional spatial location of the external objects relative to device 10.

Spatial ranging operations performed by millimeter/centimeter wave transceiver circuitry 38 are unidirectional. If desired, millimeter/centimeter wave transceiver circuitry 38 may also perform bidirectional communications with external wireless equipment such as external wireless equipment 10 (e.g., over a bi-directional millimeter/centimeter wave wireless communications link). The external wireless equipment may include other electronic devices such as electronic device 10, a wireless base station, wireless access point, a wireless accessory, or any other desired equipment that transmits and receives millimeter/centimeter wave signals. Bidirectional communications involve both the transmission of wireless data by millimeter/centimeter wave transceiver circuitry 38 and the reception of wireless data that has been transmitted by external wireless equipment. The wireless data may, for example, include data that has been encoded into corresponding data packets such as wireless data associated with a telephone call, streaming media content, internet browsing, wireless data associated with software applications running on device 10, email messages, etc.

If desired, wireless circuitry 34 may include transceiver circuitry for handling communications at frequencies below 10 GHz such as non-millimeter/centimeter wave transceiver circuitry 36. For example, non-millimeter/centimeter wave transceiver circuitry 36 may handle wireless local area network (WLAN) communications bands such as the 2.4 GHz and 5 GHz Wi-Fi® (IEEE 802.11) bands, wireless personal area network (WPAN) communications bands such as the 2.4 GHz Bluetooth® communications band, cellular telephone communications bands such as a cellular low band (LB) (e.g., 600 to 960 MHz), a cellular low-midband (LMB) (e.g., 1400 to 1550 MHz), a cellular midband (MB) (e.g., from 1700 to 2200 MHz), a cellular high band (HB) (e.g., from 2300 to 2700 MHz), a cellular ultra-high band (UHB) (e.g., from 3300 to 5000 MHz, or other cellular communications bands between about 600 MHz and about 5000 MHz (e.g., 3G bands, 4G LTE bands, 5G New Radio Frequency Range 1 (FR1) bands below 10 GHz, etc.), a near-field communications (NFC) band (e.g., at 13.56 MHz), satellite navigations bands (e.g., an L1 global positioning system (GPS) band at 1575 MHz, an L5 GPS band at 1176 MHz, a Global Navigation Satellite System (GLONASS) band, a BeiDou Navigation Satellite System (BDS) band, etc.), ultra-wideband (UWB) communications band(s) supported by the IEEE 802.15.4 protocol and/or other UWB communications protocols (e.g., a first UWB communications band at 6.5 GHz and/or a second UWB communications band at 8.0 GHz), and/or any other desired communications bands. The communications bands handled by the radio-frequency transceiver circuitry may sometimes be referred to herein as frequency bands or simply as “bands,” and may span corresponding ranges of frequencies. Non-millimeter/centimeter wave transceiver circuitry 36 and millimeter/centimeter wave transceiver circuitry 38 may each include one or more integrated circuits, power amplifier circuitry, low-noise input amplifiers, passive radio-frequency components, switching circuitry, transmission line structures, and other circuitry for handling radio-frequency signals.

In general, the transceiver circuitry in wireless circuitry 34 may cover (handle) any desired frequency bands of interest. As shown in FIG. 2, wireless circuitry 34 may include antennas 40. The transceiver circuitry may convey radio-frequency signals using one or more antennas 40 (e.g., antennas 40 may convey the radio-frequency signals for the transceiver circuitry). The term “convey radio-frequency signals” as used herein means the transmission and/or reception of the radio-frequency signals (e.g., for performing unidirectional and/or bidirectional wireless communications with external wireless communications equipment). Antennas 40 may transmit the radio-frequency signals by radiating the radio-frequency signals into free space (or to freespace through intervening device structures such as a dielectric cover layer). Antennas 40 may additionally or alternatively receive the radio-frequency signals from free space (e.g., through intervening devices structures such as a dielectric cover layer). The transmission and reception of radio-frequency signals by antennas 40 each involve the excitation or resonance of antenna currents on an antenna resonating element in the antenna by the radio-frequency signals within the frequency band(s) of operation of the antenna.

In satellite navigation system links, cellular telephone links, and other long-range links, radio-frequency signals are typically used to convey data over thousands of feet or miles. In Wi-Fi® and Bluetooth® links at 2.4 and 5 GHz and other short-range wireless links, radio-frequency signals are typically used to convey data over tens or hundreds of feet. Millimeter/centimeter wave transceiver circuitry 38 may convey radio-frequency signals over short distances that travel over a line-of-sight path. To enhance signal reception for millimeter and centimeter wave communications, phased antenna arrays and beam forming (steering) techniques may be used (e.g., schemes in which antenna signal phase and/or magnitude for each antenna in an array are adjusted to perform beam steering). Antenna diversity schemes may also be used to ensure that the antennas that have become blocked or that are otherwise degraded due to the operating environment of device 10 can be switched out of use and higher-performing antennas used in their place.

Antennas 40 in wireless circuitry 34 may be formed using any suitable antenna types. For example, antennas 40 may include antennas with resonating elements that are formed from stacked patch antenna structures, loop antenna structures, patch antenna structures, inverted-F antenna structures, slot antenna structures, planar inverted-F antenna structures, monopole antenna structures, dipole antenna structures, helical antenna structures, Yagi (Yagi-Uda) antenna structures, hybrids of these designs, etc. In another suitable arrangement, antennas 40 may include antennas with dielectric resonating elements such as dielectric resonator antennas. If desired, one or more of antennas 40 may be cavity-backed antennas. Different types of antennas may be used for different bands and combinations of bands. For example, one type of antenna may be used in forming a non-millimeter/centimeter wave wireless link for non-millimeter/centimeter wave transceiver circuitry 36 and another type of antenna may be used in conveying radio-frequency signals at millimeter and/or centimeter wave frequencies for millimeter/centimeter wave transceiver circuitry 38. Antennas 40 that are used to convey radio-frequency signals at millimeter and centimeter wave frequencies may be arranged in one or more phased antenna arrays.

Figure 3:
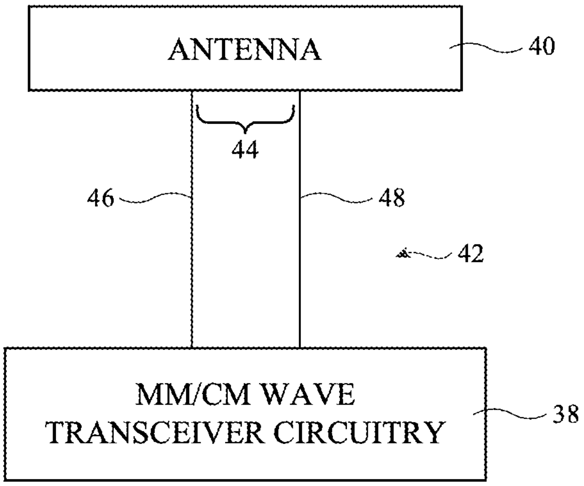
FIG. 3 is a schematic diagram of illustrative wireless circuitry in accordance with some embodiments.

A schematic diagram of an antenna 40 that may be formed in a phased antenna array for conveying radio-frequency signals at millimeter and centimeter wave frequencies is shown in FIG. 3. As shown in FIG. 3, antenna 40 may be coupled to millimeter/centimeter (MM/CM) wave transceiver circuitry 38. Millimeter/centimeter wave transceiver circuitry 38 may be coupled to antenna feed 44 of antenna 40 using a transmission line path that includes radio-frequency transmission line 42. Radio-frequency transmission line 42 may include a positive signal conductor such as signal conductor 46 and may include a ground conductor such as ground conductor 48. Ground conductor 48 may be coupled to the antenna ground for antenna 40 (e.g., over a ground antenna feed terminal of antenna feed 44 located at the antenna ground). Signal conductor 46 may be coupled to the antenna resonating element for antenna 40. For example, signal conductor 46 may be coupled to a positive antenna feed terminal of antenna feed 44 located at the antenna resonating element.

In another suitable arrangement, antenna 40 may be a probe-fed antenna that is fed using a feed probe. In this arrangement, antenna feed 44 may be implemented as a feed probe. Signal conductor 46 may be coupled to the feed probe. Radio-frequency transmission line 42 may convey radio-frequency signals to and from the feed probe. When radio-frequency signals are being transmitted over the feed probe and the antenna, the feed probe may excite the resonating element for the antenna (e.g., may excite electromagnetic resonant modes of a dielectric antenna resonating element for antenna 40). The resonating element may radiate the radio-frequency signals in response to excitation by the feed probe. Similarly, when radio-frequency signals are received by the antenna (e.g., from free space), the radio-frequency signals may excite the resonating element for the antenna (e.g., may excite electromagnetic resonant modes of the dielectric antenna resonating element for antenna 40). This may produce antenna currents on the feed probe and the corresponding radio-frequency signals may be passed to the transceiver circuitry over the radio-frequency transmission line.

Radio-frequency transmission line 42 may include a stripline transmission line (sometimes referred to herein simply as a stripline), a coaxial cable, a coaxial probe realized by metalized vias, a microstrip transmission line, an edge-coupled microstrip transmission line, an edge-coupled stripline transmission lines, a waveguide structure, combinations of these, etc. Multiple types of transmission lines may be used to form the transmission line path that couples millimeter/centimeter wave transceiver circuitry 38 to antenna feed 44. Filter circuitry, switching circuitry, impedance matching circuitry, phase shifter circuitry, amplifier circuitry, and/or other circuitry may be interposed on radio-frequency transmission line 42, if desired.

Radio-frequency transmission lines in device 10 may be integrated into ceramic substrates, rigid printed circuit boards, and/or flexible printed circuits. In one suitable arrangement, radio-frequency transmission lines in device 10 may be integrated within multilayer laminated structures (e.g., layers of a conductive material such as copper and a dielectric material such as a resin that are laminated together without intervening adhesive) that may be folded or bent in multiple dimensions (e.g., two or three dimensions) and that maintain a bent or folded shape after bending (e.g., the multilayer laminated structures may be folded into a particular three-dimensional shape to route around other device components and may be rigid enough to hold its shape after folding without being held in place by stiffeners or other structures). All of the multiple layers of the laminated structures may be batch laminated together (e.g., in a single pressing process) without adhesive (e.g., as opposed to performing multiple pressing processes to laminate multiple layers together with adhesive).

Figure 4:
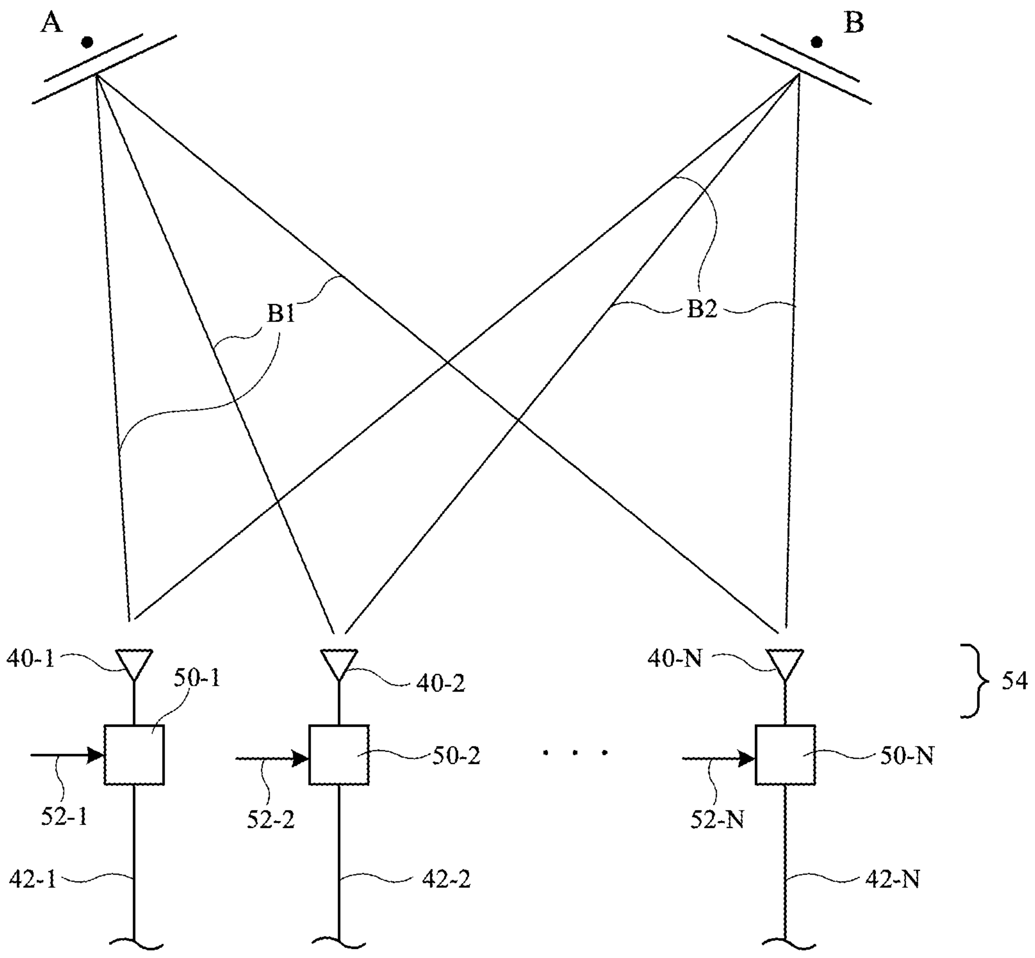
FIG. 4 is a diagram of an illustrative phased antenna array in accordance with some embodiments.

FIG. 4 shows how antennas 40 for handling radio-frequency signals at millimeter and centimeter wave frequencies may be formed in a phased antenna array. As shown in FIG. 4, phased antenna array 54 (sometimes referred to herein as array 54, antenna array 54, or array 54 of antennas 40) may be coupled to radio-frequency transmission lines 42. For example, a first antenna 40-1 in phased antenna array 54 may be coupled to a first radio-frequency transmission line 42-1, a second antenna 40-2 in phased antenna array 54 may be coupled to a second radio-frequency transmission line 42-2, an Nth antenna 40-N in phased antenna array 54 may be coupled to an Nth radio-frequency transmission line 42-N, etc. While antennas 40 are described herein as forming a phased antenna array, the antennas 40 in phased antenna array 54 may sometimes also be referred to as collectively forming a single phased array antenna.

Antennas 40 in phased antenna array 54 may be arranged in any desired number of rows and columns or in any other desired pattern (e.g., the antennas need not be arranged in a grid pattern having rows and columns). During signal transmission operations, radio-frequency transmission lines 42 may be used to supply signals (e.g., radio-frequency signals such as millimeter wave and/or centimeter wave signals) from millimeter/centimeter wave transceiver circuitry 38 (FIG. 3) to phased antenna array 54 for wireless transmission. During signal reception operations, radio-frequency transmission lines 42 may be used to supply signals received at phased antenna array 54 (e.g., from external wireless equipment or transmitted signals that have been reflected off of external objects) to millimeter/centimeter wave transceiver circuitry 38 (FIG. 3).

The use of multiple antennas 40 in phased antenna array 54 allows beam steering arrangements to be implemented by controlling the relative phases and magnitudes (amplitudes) of the radio-frequency signals conveyed by the antennas. In the example of FIG. 4, antennas 40 each have a corresponding radio-frequency phase and magnitude controller 50 (e.g., a first phase and magnitude controller 50-1 interposed on radio-frequency transmission line 42-1 may control phase and magnitude for radio-frequency signals handled by antenna 40-1, a second phase and magnitude controller 50-2 interposed on radio-frequency transmission line 42-2 may control phase and magnitude for radio-frequency signals handled by antenna 40-2, an Nth phase and magnitude controller 50-N interposed on radio-frequency transmission line 42-N may control phase and magnitude for radio-frequency signals handled by antenna 40-N, etc.).

Phase and magnitude controllers 50 may each include circuitry for adjusting the phase of the radio-frequency signals on radio-frequency transmission lines 42 (e.g., phase shifter circuits) and/or circuitry for adjusting the magnitude of the radio-frequency signals on radio-frequency transmission lines 42 (e.g., power amplifier and/or low noise amplifier circuits). Phase and magnitude controllers 50 may sometimes be referred to collectively herein as beam steering circuitry (e.g., beam steering circuitry that steers the beam of radio-frequency signals transmitted and/or received by phased antenna array 54).

Phase and magnitude controllers 50 may adjust the relative phases and/or magnitudes of the transmitted signals that are provided to each of the antennas in phased antenna array 54 and may adjust the relative phases and/or magnitudes of the received signals that are received by phased antenna array 54. Phase and magnitude controllers 50 may, if desired, include phase detection circuitry for detecting the phases of the received signals that are received by phased antenna array 54. The term "beam" or "signal beam" may be used herein to collectively refer to wireless signals that are transmitted and received by phased antenna array 54 in a particular direction. The signal beam may exhibit a peak gain that is oriented in a particular pointing direction at a corresponding pointing angle (e.g., based on constructive and destructive interference from the combination of signals from each antenna in the phased antenna array). The term "transmit beam" may sometimes be used herein to refer to radio-frequency signals that are transmitted in a particular direction whereas the term "receive beam" may sometimes be used herein to refer to radio-frequency signals that are received from a particular direction.

If, for example, phase and magnitude controllers 50 are adjusted to produce a first set of phases and/or magnitudes for transmitted radio-frequency signals, the transmitted signals will form a transmit beam as shown by beam B1 of FIG. 4 that is oriented in the direction of point A. If, however, phase and magnitude controllers 50 are adjusted to produce a second set of phases and/or magnitudes for the transmitted signals, the transmitted signals will form a transmit beam as shown by beam B2 that is oriented in the direction of point B. Similarly, if phase and magnitude controllers 50 are adjusted to produce the first set of phases and/or magnitudes, radio-frequency signals (e.g., radio-frequency signals in a receive beam) may be received from the direction of point A, as shown by beam B1. If phase and magnitude controllers 50 are adjusted to produce the second set of phases and/or magnitudes, radio-frequency signals may be received from the direction of point B, as shown by beam B2.

Each phase and magnitude controller 50 may be controlled to produce a desired phase and/or magnitude based on a corresponding control signal 52 received from control circuitry 28 of FIG. 2 (e.g., the phase and/or magnitude provided by phase and magnitude controller 50-1 may be controlled using control signal 52-1, the phase and/or magnitude provided by phase and magnitude controller 50-2 may be controlled using control signal 52-2, etc.). If desired, the control circuitry may actively adjust control signals 52 in real time to steer the transmit or receive beam in different desired directions over time. Phase and magnitude controllers 50 may provide information identifying the phase of received signals to control circuitry 28 if desired.

When performing wireless communications using radio-frequency signals at millimeter and centimeter wave frequencies, the radio-frequency signals are conveyed over a line of sight path between phased antenna array 54 and external communications equipment. If the external object is located at point A of FIG. 4, phase and magnitude controllers 50 may be adjusted to steer the signal beam towards point A (e.g., to steer the pointing direction of the signal beam towards point A). Phased antenna array 54 may transmit and receive radio-frequency signals in the direction of point A. Similarly, if the external communications equipment is located at point B, phase and magnitude controllers 50 may be adjusted to steer the signal beam towards point B (e.g., to steer the pointing direction of the signal beam towards point B). Phased antenna array 54 may transmit and receive radio-frequency signals in the direction of point B. In the example of FIG. 4, beam steering is shown as being performed over a single degree of freedom for the sake of simplicity (e.g., towards the left and right on the page of FIG. 4). However, in practice, the beam may be steered over two or more degrees of freedom (e.g., in three dimensions, into and out of the page and to the left and right on the page of FIG. 4). Phased antenna array 54 may have a corresponding field of view over which beam steering can be performed (e.g., in a hemisphere or a segment of a hemisphere over the phased antenna array). If desired, device 10 may include multiple phased antenna arrays that each face a different direction to provide coverage from multiple sides of the device.

Any desired antenna structures may be used for implementing antennas 40. In one suitable arrangement that is sometimes described herein as an example, patch antenna structures may be used for implementing antennas 40. Antennas 40 that are implemented using patch antenna structures may sometimes be referred to herein as patch antennas. An illustrative patch antenna that may be used in phased antenna array 54 of FIG. 4 is shown in FIG. 5.

Figure 5:
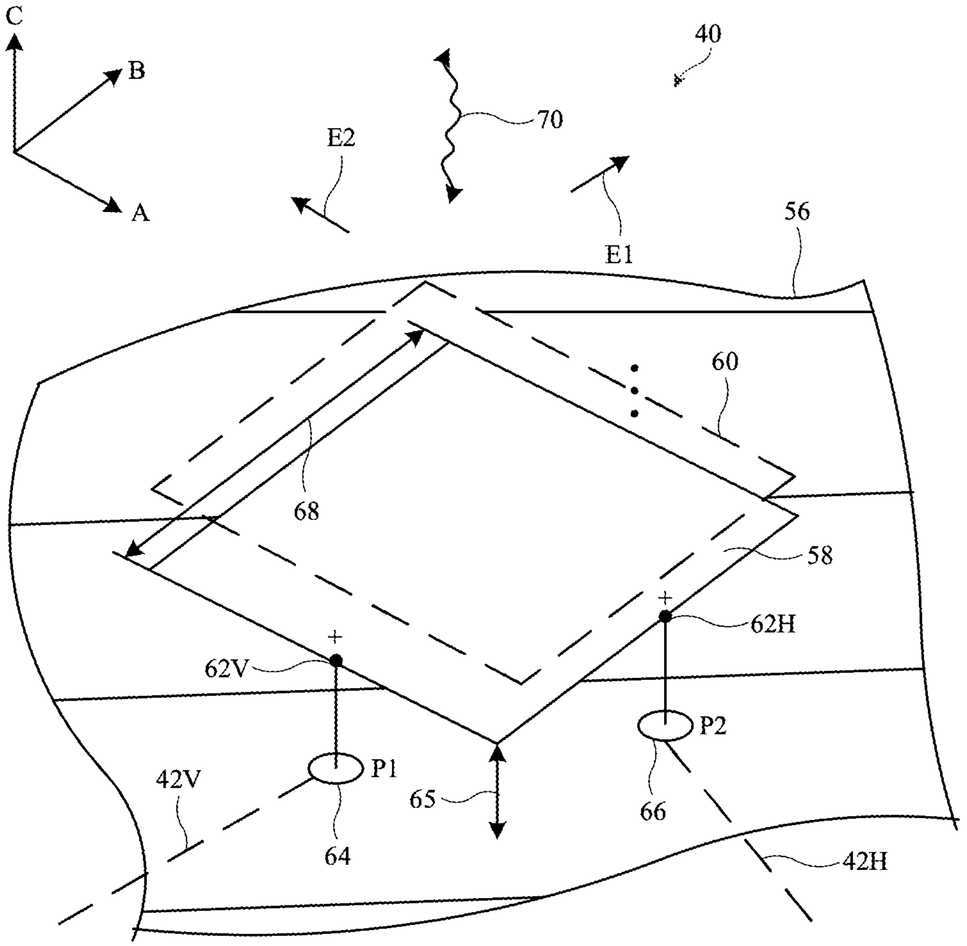
FIG. 5 is a perspective view of illustrative patch antenna structures in accordance with some embodiments.

As shown in FIG. 5, antenna 40 may have a patch antenna resonating element 58 that is separated from and parallel to a ground plane such as antenna ground 56. Patch antenna resonating element 58 may lie within a plane such as the A-B plane of FIG. 5 (e.g., the lateral surface area of element 58 may lie in the A-B plane). Patch antenna resonating element 58 may sometimes be referred to herein as patch 58, patch element 58, patch resonating element 58, antenna resonating element 58, or resonating element 58. Antenna ground 56 may lie within a plane that is parallel to the plane of patch element 58. Patch element 58 and antenna ground 56 may therefore lie in separate parallel planes that are separated by distance 65. Patch element 58 and antenna ground 56 may be formed from conductive traces patterned on a dielectric substrate such as a rigid or flexible printed circuit board substrate, metal foil, stamped sheet metal, electronic device housing structures, or any other desired conductive structures.

The length of the sides of patch element 58 may be selected so that antenna 40 resonates at a desired operating frequency. For example, the sides of patch element 58 may each have a length 68 that is approximately equal to half of the wavelength of the signals conveyed by antenna 40 (e.g., the effective wavelength given the dielectric properties of the materials surrounding patch element 58). In one suitable arrangement, length 68 may be between 0.8 mm and 1.2 mm (e.g., approximately 1.1 mm) for covering a millimeter wave frequency band between 57 GHz and 70 GHz or between 1.6 mm and 2.2 mm (e.g., approximately 1.85 mm) for covering a millimeter wave frequency band between 37 GHz and 41 GHz, as just two examples.

The example of FIG. 5 is merely illustrative. Patch element 58 may have a square shape in which all of the sides of patch element 58 are the same length or may have a different rectangular shape. Patch element 58 may be formed in other shapes having any desired number of straight and/or curved edges.

To enhance the polarizations handled by antenna 40, antenna 40 may be provided with multiple feeds. As shown in FIG. 5, antenna 40 may have a first feed at antenna port P1 that is coupled to a first radio-frequency transmission line 42 such as radio-frequency transmission line 42V. Antenna 40 may have a second feed at antenna port P2 that is coupled to a second radio-frequency transmission line 42 such as radio-frequency transmission line 42H. The first antenna feed may have a first ground feed terminal coupled to antenna ground 56 (not shown in FIG. 5 for the sake of clarity) and a first positive antenna feed terminal 62V coupled to patch element 58. The second antenna feed may have a second ground feed terminal coupled to antenna ground 56 (not shown in FIG. 5 for the sake of clarity) and a second positive antenna feed terminal 62H on patch element 58.

Holes or openings such as openings 64 and 66 may be formed in antenna ground 56. Radio-frequency transmission line 42V may include a vertical conductor (e.g., a conductive through-via, conductive pin, metal pillar, solder bump, combinations of these, or other vertical conductive interconnect structures) that extends through opening 64 to positive antenna feed terminal 62V on patch element 58. Radio-frequency transmission line 42H may include a vertical conductor that extends through opening 66 to positive antenna feed terminal 62H on patch element 58. This example is merely illustrative and, if desired, other transmission line structures may be used (e.g., coaxial cable structures, stripline transmission line structures, etc.).

When using the first antenna feed associated with port P1, antenna 40 may transmit and/or receive radio-frequency signals having a first polarization (e.g., the electric field E1 of radio-frequency signals 70 associated with port P1 may be oriented parallel to the B-axis in FIG. 5). When using the antenna feed associated with port P2, antenna 40 may transmit and/or receive radio-frequency signals having a second polarization (e.g., the electric field E2 of radio-frequency signals 70 associated with port P2 may be oriented parallel to the A-axis of FIG. 5 so that the polarizations associated with ports P1 and P2 are orthogonal to each other).

One of ports P1 and P2 may be used at a given time so that antenna 40 operates as a single-polarization antenna or both ports may be operated at the same time so that antenna 40 operates with other polarizations (e.g., as a dual-polarization antenna, a circularly-polarized antenna, an elliptically-polarized antenna, etc.). If desired, the active port may be changed over time so that antenna 40 can switch between covering vertical or horizontal polarizations at a given time. Ports P1 and P2 may be coupled to different phase and magnitude controllers 50 (FIG. 3) or may both be coupled to the same phase and magnitude controller 50. If desired, ports P1 and P2 may both be operated with the same phase and magnitude at a given time (e.g., when antenna 40 acts as a dual-polarization antenna). If desired, the phases and magnitudes of radio-frequency signals conveyed over ports P1 and P2 may be controlled separately and varied over time so that antenna 40 exhibits other polarizations (e.g., circular or elliptical polarizations).

If care is not taken, antennas 40 such as dual-polarization patch antennas of the type shown in FIG. 5 may have insufficient bandwidth for covering relatively wide ranges of frequencies. It may be desirable for antenna 40 to be able to cover both a first frequency band and a second frequency band at frequencies higher than the first frequency band. In one suitable arrangement that is described herein as an example, the first frequency band may include frequencies from about 24-30 GHz whereas the second frequency band includes frequencies from about 37-40 GHz. In these scenarios, patch element 58 may not exhibit sufficient bandwidth on its own to cover an entirety of both the first and second frequency bands.

If desired, antenna 40 may include one or more additional patch elements 60 that are stacked over patch element 58. Each patch element 60 may partially or completely overlap patch element 58. Patch elements 60 may have sides with lengths other than length 68, which configure patch elements 60 to radiate at different frequencies than patch element 58, thereby extending the overall bandwidth of antenna 40. Patch elements 60 may include directly-fed patch elements (e.g., patch elements with positive antenna feed terminals directly coupled to transmission lines) and/or parasitic antenna resonating elements that are not directly fed by antenna feed terminals and transmission lines. One or more patch elements 60 may be coupled to patch element 58 by one or more conductive through vias if desired (e.g., so that at least one patch element 60 and patch element 58 are coupled together as a single directly fed resonating element). In scenarios where patch elements 60 are directly fed, patch elements 60 may include two positive antenna feed terminals for conveying signals with different (e.g., orthogonal) polarizations and/or may include a single positive antenna feed terminal for conveying signals with a single polarization.

The combined resonance of patch element 58 and each of patch elements 60 may configure antenna 40 to radiate with satisfactory antenna efficiency across an entirety of both the first and second frequency bands (e.g., from 24-30 GHz and from 37-40 GHz). The example of FIG. 5 is merely illustrative. Patch elements 60 may be omitted if desired. Patch elements 60 may be rectangular, square, cross-shaped, or any other desired shape having any desired number of straight and/or curved edges. Patch element 60 may be provided at any desired orientation relative to patch element 58. Antenna 40 may have any desired number of feeds. Other antenna types may be used if desired (e.g., dipole antennas, monopole antennas, slot antennas, etc.).

Figure 6:
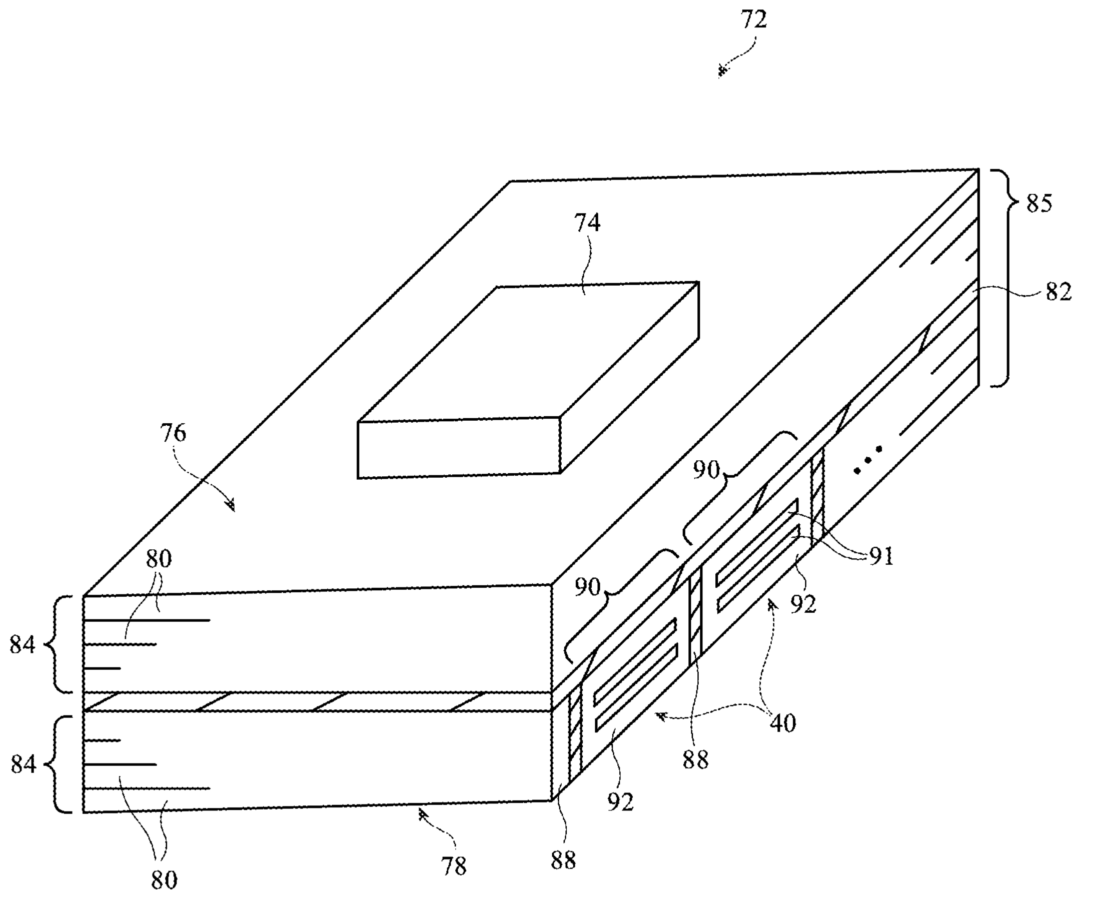
FIG. 6 is a perspective view of an illustrative antenna module in accordance with some embodiments.

If desired, phased antenna array 54 may be integrated with other circuitry such as a radio-frequency integrated circuit to form an integrated antenna panel. FIG. 6 is a rear perspective view of an illustrative integrated antenna panel for handling signals at frequencies greater than 10 GHz in device 10. As shown in FIG. 6, device 10 may be provided with an integrated antenna panel such as antenna panel 72 (sometimes referred to herein as panel 72, antenna module 72, or module 72).

Antenna panel 72 may include phased antenna array 54 of antennas 40 formed on a dielectric substrate such as substrate 85. Substrate 85 may be, for example, a rigid or printed circuit board, flexible printed circuit, or other dielectric substrate. Substrate 85 may be a stacked dielectric substrate that includes multiple stacked dielectric layers 80 (e.g., multiple layers of printed circuit board substrate such as multiple layers of fiberglass-filled epoxy, rigid printed circuit board material, flexible printed circuit board material, ceramic, plastic, glass, or other dielectrics). Phased antenna array 54 may include any desired number of antennas 40 arranged in any desired pattern. Each antenna 40 may include a respective set of patch elements 91 (e.g., patch elements such as patch elements 58 and/or 60 of FIG. 5).

One or more electrical components 74 may be mounted on (top) surface 76 of substrate 85 (e.g., the surface of substrate 85 opposite surface 78 and patch elements 91). Component 74 may, for example, include an integrated circuit (e.g., an integrated circuit chip) or other circuitry mounted to surface 76 of substrate 85. Component 74 may include radio-frequency components such as amplifier circuitry, phase shifter circuitry (e.g., phase and magnitude controllers 50 of FIG. 4), and/or other circuitry that operates on radio-frequency signals. Component 74 may sometimes be referred to herein as radio-frequency integrated circuit (RFIC) 74. However, this is merely illustrative and, in general, the circuitry of RFIC 74 need not be formed on an integrated circuit. RFIC 74 may be omitted from antenna panel 72 if desired.

The dielectric layers 80 in substrate 85 may include a first set of layers 86 (sometimes referred to herein as antenna layers 86) and a second set of layers 84 (sometimes referred to herein as transmission line layers 84). Ground traces 82 may separate antenna layers 86 from transmission line layers 84. Conductive traces or other metal layers on transmission line layers 84 may be used in forming transmission line structures such as radio-frequency transmission lines 42 of FIG. 4 (e.g., radio-frequency transmission lines 42V and 42H of FIG. 5). For example, conductive traces on transmission line layers 84 may be used in forming stripline or microstrip transmission lines that are coupled between the antenna feeds for antennas 40 (e.g., over conductive vias extending through antenna layers 86) and RFIC 74 (e.g., over conductive vias extending through transmission line layers 84). A board-to-board connector (not shown) may couple RFIC 74 to the baseband and/or transceiver circuitry for phased antenna array 54 (e.g., millimeter/centimeter wave transceiver circuitry 38 of FIG. 3).

If desired, each antenna 40 in phased antenna array 54 may be laterally surrounded by fences of conductive vias 88 (e.g., conductive vias extending parallel to the X-axis and through antenna layers 86 of FIG. 6). The fences of conductive vias 88 for phased antenna array 54 may be shorted to ground traces 82 so that the fences of conductive vias 88 are held at a ground potential. Conductive vias 88 may extend downwards to surface 78 or to the same dielectric layer 80 as the bottom-most conductive patch 91 in phased antenna array 54. The fences of conductive vias 88 may be opaque at the frequencies covered by antennas 40. Each antenna 40 may lie within a respective antenna cavity 92 having conductive cavity walls defined by a corresponding set of fences of conductive vias 88 in antenna layers 86. The fences of conductive vias 88 may help to ensure that each antenna 40 in phased antenna array 54 is suitably isolated, for example. Phased antenna array 54 may include a number of antenna unit cells 90. Each antenna unit cell 90 may include respective fences of conductive vias 88, a respective antenna cavity 92 defined by (e.g., laterally surrounded by) those fences of conductive vias, and a respective antenna 40 (e.g., set of patch elements 91) within that antenna cavity 92.

Figure 7:
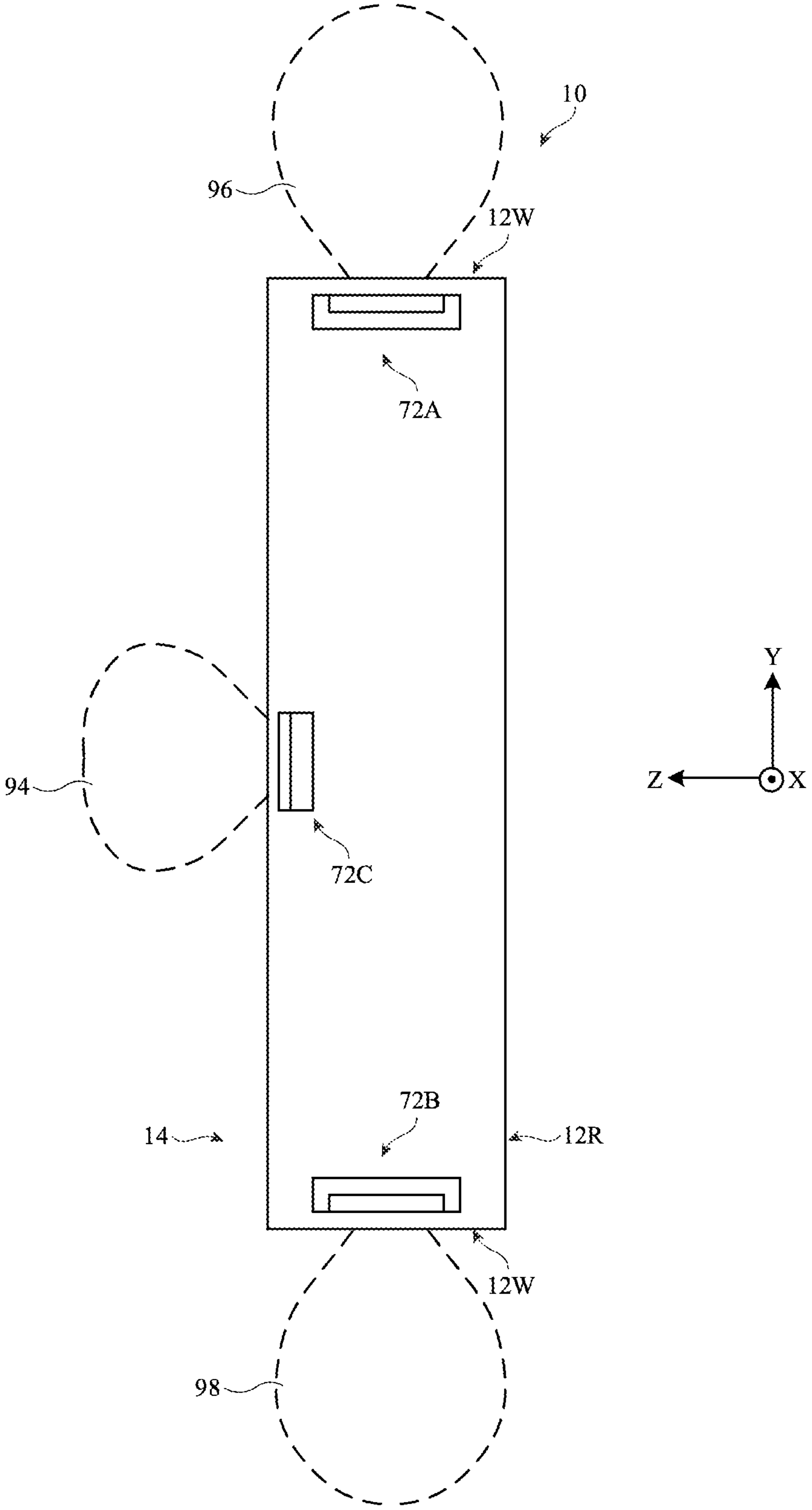
FIG. 7 is a cross-sectional side view of an illustrative electronic device having antenna panels for radiating through the front face and through sidewalls of the electronic device in accordance with some embodiments.

One or more antenna panels 72 may be mounted at different locations within device 10. FIG. 7 is a cross-sectional side view showing one example of how device 10 may include three antenna panels 72 for radiating through different sides of device 10. As shown in FIG. 7, device 10 may include antenna panels 72A, 72B, and 72C mounted within housing 12. Antenna panel 72C may radiate through the front face of device 10 (e.g., through a display cover layer in display 14) to provide radio-frequency coverage within coverage area 94. Antenna panel 72C may, for example, form different signal beams in different beam pointing directions within/across coverage area 94. Coverage area 94 may allow the antenna panels 72 in device 10 to cover some or all of the hemisphere over the front face of device 10, for example.

Antenna panels 72A and 72B may be mounted along respective peripheral conductive housing structures 12W of device 10 (e.g., along opposing sidewalls of device 10). Peripheral conductive housing structures 12W may include conductive material (e.g., metal) with dielectric antenna windows (apertures) that allow antenna panels 72A and 72B to radiate through peripheral conductive housing structures 12W. Antenna panel 72A may provide radio-frequency coverage within coverage area 96. Antenna panel 72B may provide radio-frequency coverage within coverage area 98. In examples where antenna panels 72A and 72B are mounted at opposing ends of device 10 (e.g., as shown in FIG. 7), coverage areas 96 and 98 may allow antenna panels 72A and 72B to provide radio-frequency coverage for opposing sides of device 10.

Antenna panels 72A, 72B, and 72C may collectively provide radio-frequency coverage for device 10 (e.g., within coverage areas 96, 98, and 94) across most of the sphere around device 10. However, in some scenarios where rear housing wall 12R includes a substantial amount of conductive material (e.g., when rear housing wall 12R is formed entirely from metal such as a planar sheet of metal that extends across the length and width of device 10), the conductive material in rear housing wall 12R may block some of the radio-frequency signals conveyed by antenna panels 72A and 72B within coverage areas 96 and 98, respectively. This may limit the collective radio-frequency coverage provided by antenna panels 72A, 72B, and 72C within portions of the hemisphere below the rear face of device 10 (e.g., so-called "out of coverage (OOC) areas"). This may impede wireless communications between device 10 and external communications equipment when the external communications equipment is located within the OOC areas below rear housing wall 12R.

While device 10 may include additional antenna panels that are aligned with apertures in the conductive material of rear housing wall 12R for providing supplemental coverage within the OOC areas, adding additional antenna panels to device 10 can consume an excessive amount of device space, power, and other resources and adding apertures to rear housing wall 12R may undesirably affect the cosmetic and/or mechanical performance of rear housing wall 12R. In the example of FIG. 7, antenna panels 72A and 72B have lateral areas (e.g., surfaces) that extend parallel to peripheral conductive housing structures 12W (e.g., parallel to the Z-axis of FIG. 7). To provide device 10 with as much radio-frequency coverage (e.g., at frequencies greater than 10 GHz) as possible within the sphere around device 10 (e.g., without adding additional antenna panels or apertures to the device), antenna panels 72A and/or 72B may be tilted at non-parallel angles with respect to peripheral conductive housing structures 12W.

Figure 8:
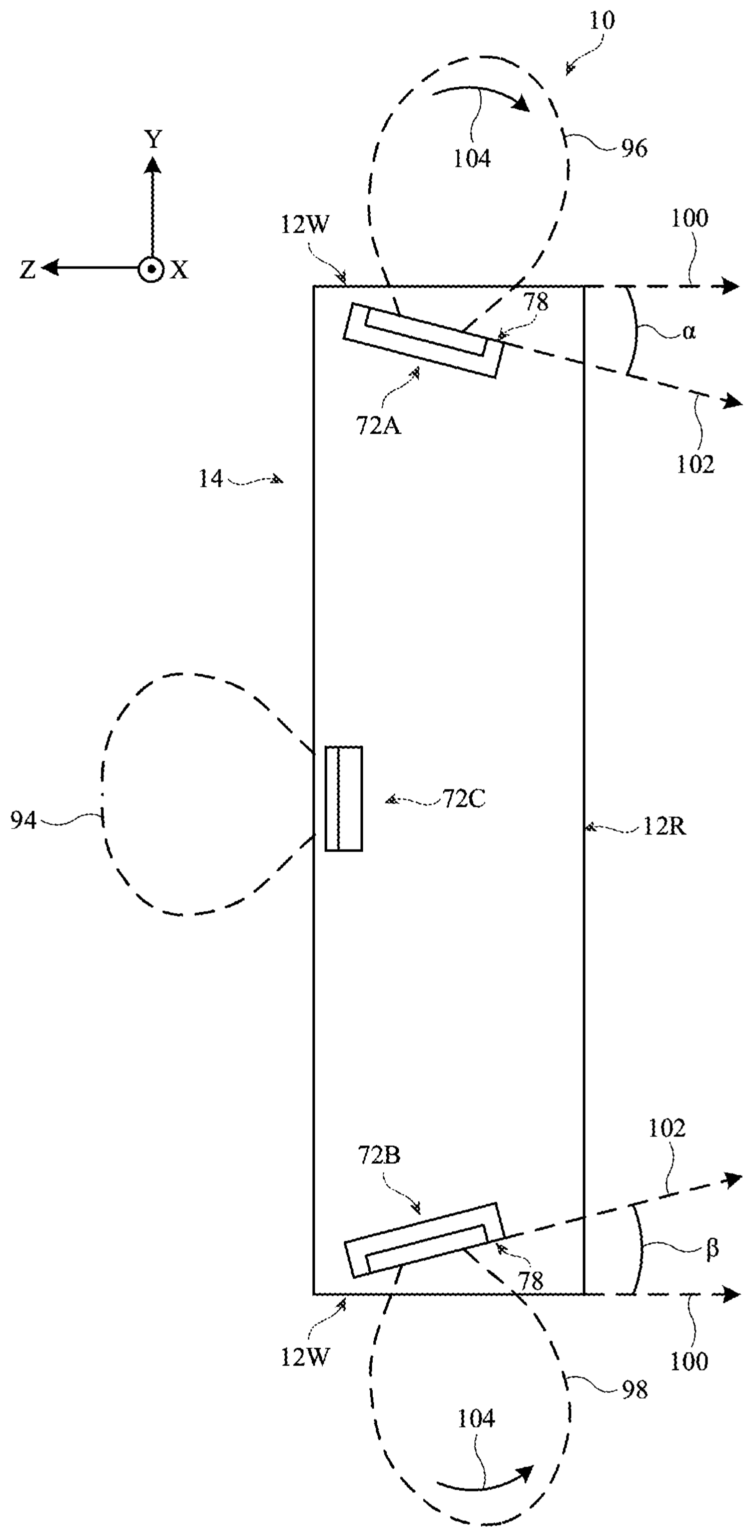
FIG. 8 is a cross-sectional side view showing how illustrative antenna panels may be tilted with respect to electronic device sidewalls to optimize radio-frequency coverage behind a rear face of the electronic device in accordance with some embodiments.

FIG. 8 is a cross-sectional side view showing how antenna panels 72A and 72B may be tilted with respect to peripheral conductive housing structures 12W. As shown in FIG. 8, antenna panels 72A and 72B may be characterized by a lateral axis 102 that lies within the lateral surface of the antenna panels (e.g., surface 78 of the substrate in the antenna panels). Peripheral conductive housing structures 12W may be characterized by a lateral axis 100 that lies within the lateral surface of the sidewalls of device 10 (e.g., parallel to the Z-axis of FIG. 8 and perpendicular to the lateral face of display 14 and/or rear housing wall 12R).

Antenna panel 72A may be tilted downwards towards rear housing wall 12R by angle $\alpha$ (e.g., as defined by the angle between the lateral axis 102 of antenna panel 72A and lateral axis 100 of the portion of peripheral conductive housing structures 12W adjacent antenna panel 72A). In examples where antenna panel 72A is not tilted downwards (e.g., as shown in FIG. 7), angle $\alpha$ is equal to zero. In other words, antenna panel 72A may be referred to herein as being "tilted" (e.g., by a non-zero angle) or provided with a "tilt" (e.g., a non-zero tilt) when angle $\alpha$ (sometimes referred to herein as a tilt angle or panel angle) is non-zero (e.g., when the lateral surface of substrate or equivalently axis 102 is oriented at a non-zero angle with respect to the lateral surface of peripheral conductive housing structures 12W in the X-Z plane or equivalently with respect to axis 100). Additionally or alternatively, antenna panel 72B may be tilted downwards towards rear housing wall 12R by angle $\beta$ (e.g., as defined by the angle between the lateral axis 102 of antenna panel 72B and lateral axis 100 of the portion of peripheral conductive housing structures 12W adjacent antenna panel 72B). In examples where antenna panel 72B is not tilted downwards (e.g., as shown in FIG. 7), angle β is equal to zero. Angle β may be equal to angle α (e.g., angles α and β may be equal in magnitude and opposite of sign such that the angles extend from opposing sides of the Z-axis, where β=−α) or angle β may be different than angle α. Angles β and α may be between 0 degrees and 45 degrees if desired (e.g., 15 degrees, 10-20 degrees, 5-25 degrees, 5-30 degrees, 2-40 degrees, 1-10 degrees, 1-20 degrees, etc.).

Tilting antenna panel 72A may shift (tilt) its coverage area 96 and tilting antenna panel 72B may shift (tilt) its coverage area 98 towards the rear face of device 10, as shown by arrows 104. Tilting the antenna panels may also sometimes be referred to herein as rotating the antenna panels (e.g., where a tilted antenna panel is sometimes referred to as a rotated antenna panel) or angling the antenna panels (e.g., where a tilted antenna panel is sometimes referred to as an angled antenna panel). This rotation in coverage area may allow antenna panels 72A and/or 72B to minimize the presence of OOC areas within the hemisphere below rear housing wall 12R despite the presence of conductive material in rear housing wall 12R (e.g., without requiring additional antenna panels to be disposed within device 10). The example of FIG. 8 is merely illustrative. If desired, antenna panels 72C and/or 72B may be omitted. Antenna panels 72A and 72B need not be mounted adjacent opposing sidewalls of device 10 and may, in general, be mounted adjacent any sidewalls of device 10. Device 10 may include more than three antenna panels 72 if desired. Antenna panels 72A, 72B, and 72C may each include one or more antennas 40 arranged in any desired pattern (e.g., a one-dimensional or two-dimensional array pattern for forming part of one or more phased antenna arrays). Antenna panels 72A and 72B may sometimes be referred to herein as tilted antenna panels. Tilted antenna panels may be mounted within device 10 in any desired manner.

Figure 9:
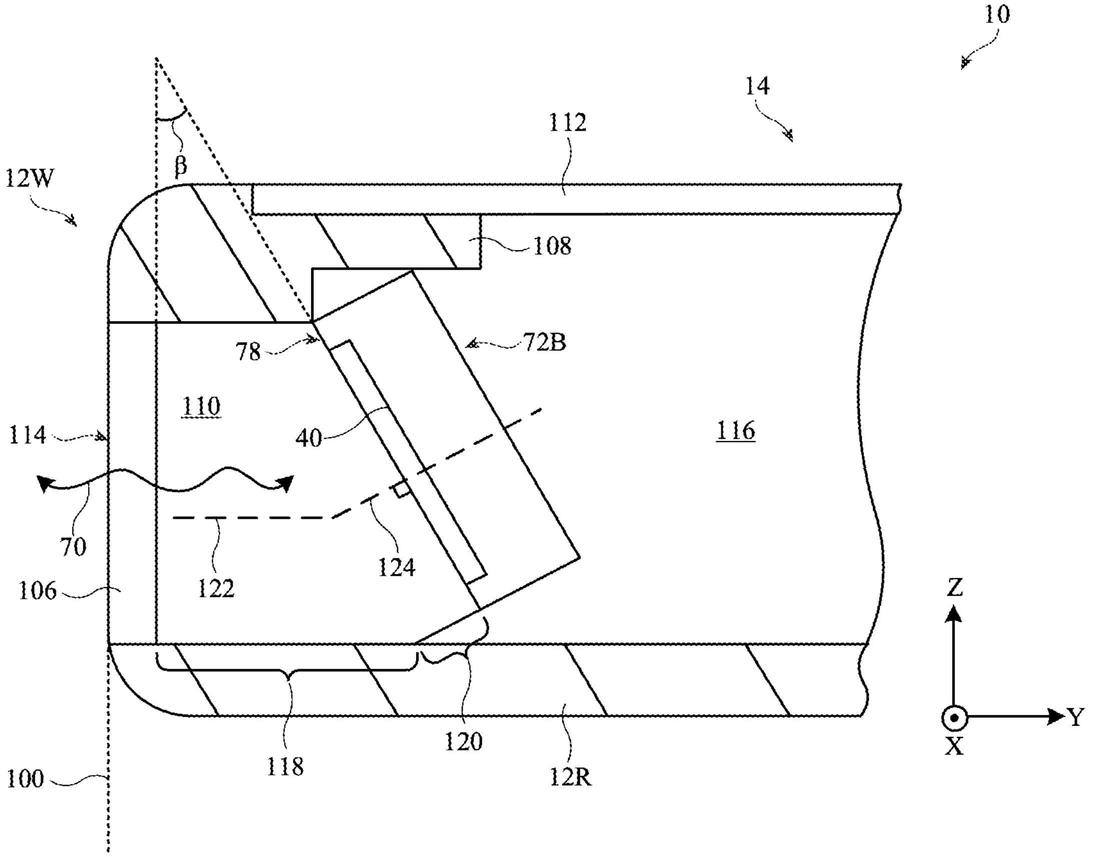
FIG. 9 is a cross-sectional side view showing how an illustrative tilted antenna panel may be aligned with a multi-segment aperture for radiating through an electronic device sidewall in accordance with some embodiments.

FIG. 9 is a cross-sectional side view showing one example of how antenna panel 72B may be mounted within device 10. As shown in FIG. 9, antenna panel 72B may be mounted within the interior volume 116 of device 10 in alignment with a corresponding aperture 110 in peripheral conductive housing structures 12W (e.g., where the antenna(s) 40 in antenna panel 72B face aperture 110). Aperture 110 may include dielectric material that allows the aperture to serve as a dielectric antenna window for radio-frequency signals to pass through peripheral conductive housing structures 12W without being blocked by the conductive material of peripheral conductive housing structures 12W. For example, aperture 110 may include injection-molded plastic, epoxy, polymer, and/or other dielectric materials. The antenna(s) 40 in antenna panel 72B may radiate through aperture 110 (e.g., in a signal beam within coverage area 98 of FIG. 8).

Peripheral conductive housing structures 12W may have an inwardly-protruding portion such as ledge (datum) 108. Some or all of antenna panel 72B may be vertically interposed between ledge 108 and rear housing wall 12R. Display 14 may be mounted to ledge 108. For example, display 14 may have a display cover layer such as display cover layer 112. A layer of adhesive may be used to adhere display cover layer 112 to ledge 108. Aperture 110 may allow the antenna(s) 40 in antenna panel 72B to convey radio-frequency signals through peripheral conductive housing structures 12W. A dielectric cover layer such as dielectric cover layer 106 (sometimes referred to herein as antenna window 106) may overlap aperture 110 to protect antenna panel 72B and the interior of device 10 from damage or contaminants. Antenna window 106 may be formed from glass, plastic, sapphire, ceramic, or other dielectric materials. The lateral axis 100 of peripheral conductive housing structures 12W lies within (extends through) exterior surface 114 of antenna window 106 (e.g., the exterior surface of peripheral conductive housing structures 12W). Aperture 110 defines a cavity within peripheral conductive housing structures 12W that may, if desired, contribute resonant modes and/or perform impedance matching for the radio-frequency signals conveyed by antenna panel 72B.

As shown in FIG. 9, antenna panel 72B may be tilted at angle β with respect to exterior surface 114 (lateral axis 100). Lateral surface 78 of antenna panel 72B may be pressed, affixed, molded, attached, adhered, and/or mounted against the dielectric material in aperture 110. In the example of FIG. 9, aperture 110 is a multi-segment aperture in which the dielectric material of the aperture includes a first segment 118 that extends along a first longitudinal axis 122 and a second segment 120 that extends along a second longitudinal axis 124 oriented at a non-parallel angle with respect to longitudinal axis 122 (e.g., where longitudinal axis 124 is perpendicular to lateral surface 78 of antenna panel 72B).

In other words, segment 120 is tilted with respect to segment 118 of aperture 110 (e.g., aperture 110 is bent or nonlinear). This may allow antenna panel 72B to fit within interior volume 116 with minimal effect to the structure or geometry of peripheral conductive housing structures 12W. However, bending aperture 110 in this way creates an electromagnetic discontinuity where segment 118 meets segment 120 that can undesirably limit the radio-frequency performance of antenna panel 72B. If desired, aperture 110 may include a single straight segment to eliminate the electromagnetic discontinuity, as shown in the cross-sectional side view of FIG. 10.

Figure 10:
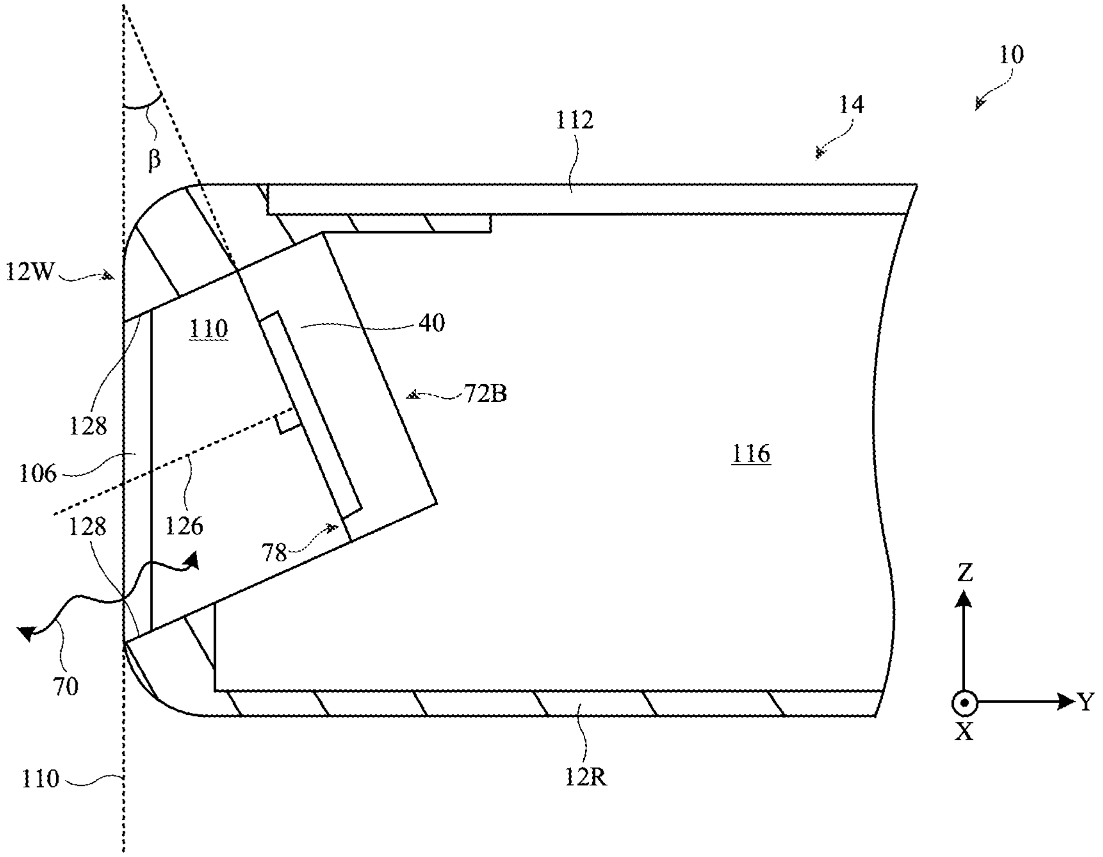
FIG. 10 is a cross-sectional side view showing how an illustrative tilted antenna panel may be aligned with a tilted aperture for radiating through an electronic device sidewall in accordance with some embodiments.

As shown in FIG. 10, aperture 110 may include a single segment extending along longitudinal axis 126 (e.g., an axis oriented perpendicular to lateral surface 78 of antenna panel 72B). In this example, antenna window 106 includes peripheral edges 128 that are angled (e.g., at a non-zero angle with respect to the Y-axis) to be parallel with the edges of aperture 110. In other words, peripheral conductive housing structures 12W may define continuous planar walls extending along aperture 110 (e.g., without multiple segments or a bend as shown in FIG. 9). This may serve to remove the electromagnetic discontinuity associated with segments 118 and 120 of FIG. 9. Peripheral conductive housing structures 12W may include notches, recesses, or other structures or geometries to accommodate positioning antenna panel 72B within interior volume 116 in alignment with aperture 110, if desired. The examples of FIGS. 9 and 10 are merely illustrative and, in general, aperture 110 may have other shapes. Antenna panel 72A of FIG. 8 may be similarly mounted adjacent a corresponding aperture 110 in peripheral conductive housing structures 12W.

Angles β and α may be selected to optimize the overall radio-frequency coverage collectively provided within the hemisphere behind the rear face of device 10 by antenna panels 72A and 72B. The total coverage for antenna panels 72A, 72B, and 72C within the sphere around device 10 may be characterized by a metric such as effective radiated power (EIRP), which is given by the sum of the power from each antenna panel. The coverage provided by the antenna panels may also be characterized by a cumulative distribution function (CDF) of the EIRP from all antenna panels in a given millimeter/centimeter wave band.

Figure 11:
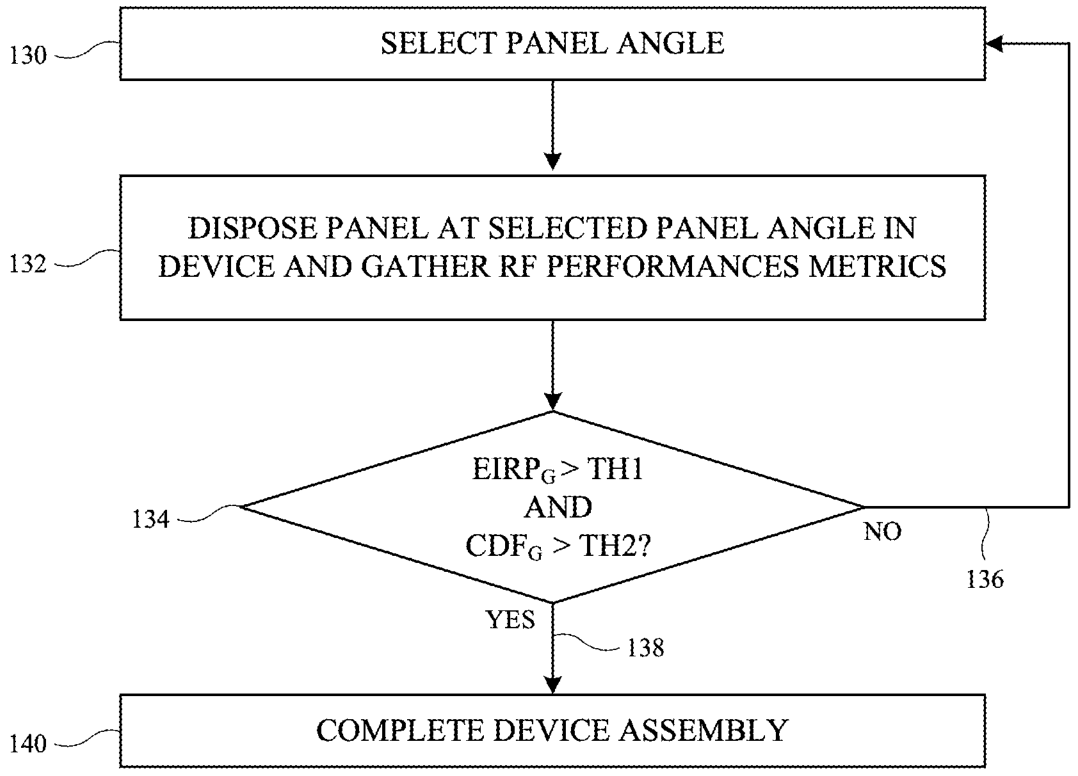
FIG. 11 is a flow chart of illustrative operations involved in optimizing radio-frequency coverage around an electronic device using tilted antenna panels in accordance with some embodiments.

FIG. 11 is a flow chart of illustrative operations that may be performed to assemble device 10 having antenna panels 72B and 72A tilted at angles β and α, respectively. The operations of FIG. 11 may be performed by assembly, design, manufacturing, and/or testing equipment during the design, assembly, testing, calibration, and/or manufacture of device 10, for example. The operations of FIG. 11 may be performed to mount antenna panels 72A and 72B at optimal angles α and β that maximize total spherical coverage while improving coverage within the OOC areas within the hemisphere behind rear housing wall 12R.

At operation 130, the equipment may select angles β and α (sometimes referred to herein as panel angles).

At operation 132, the equipment may dispose (mount) antenna panel 72A at angle α within device 10 and may dispose (mount) antenna panel 72B at angle β within device 10. The equipment may then convey radio-frequency signals using antenna panels 72A and 72B while gathering wireless performance metric data using the radio-frequency signals. The wireless performance metric data may be indicative of the radiated power of the antenna panels at the selected panel angles, for example. The wireless performance metric data may include an EIRP value $EIRP_G=EIRP_{POST}-EIRP_{PRE}$, where $EIRP_{POST}$ is the EIRP of the panels after mounting at the selected panel angles and $EIRP_{PRE}$, is the EIRP of the panels prior to mounting at the selected panel angles. The wireless performance metric data may also include a CDF value $CDF_G=CDF_{POST}-CDF_{PRE}$, where $CDF_{POST}$ is the CDF of the panels after mounting at the selected panel angles and $CDF_{POST}$ is the CDF of the panels prior to mounting at the selected panel angles.

At operation 134, the equipment may compare $EIRP_G$ to a first threshold value TH1 and may compare $CDF_G$ to a second threshold value TH2. If $EIRP_G \leq TH1$ or $CDF_G \leq TH2$, processing may loop back to operation 130 via path 136 and new panel angles may be tested. If $EIRP_G > TH1$ and $CDF_G > TH2$, processing may proceed to operation 140 via path 140. At operation 140, the equipment may complete assembly of device 10 with the antenna panels at the selected panel angles and/or may assemble additional devices with the selected panel angles.

FIG. 12 is a table showing some examples of illustrative panel angles that may be used for antenna panels 72A and/or 72B. The equipment may identify a P50 CDF and a P5 CDF for a set of different panel angles such as zero degrees, five degrees, 15 degrees, and 45 degrees. As shown in FIG. 12, there is an improvement in both 5% CDF and at 50% CDF at different non-zero panel angles (e.g., a panel angle of 15 degrees may allow the panels to exhibit peak P50 CDF). Setting angle α=15 degrees (e.g., 5-25 degrees) and angle β=−15 degrees (e.g., −25 to −5 degrees) with respect to the −Z axis of FIG. 8 may configure antenna panels 72A, 72B, and 72C to collectively exhibit optimal coverage across as much of the sphere around device 10 and the OOC areas behind the rear face of device 10 as possible. This is merely illustrative and, in general, other panel angles may be used.

Device 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing is merely illustrative and various modifications can be made by those skilled in the art without departing from the scope and spirit of the described embodiments. The foregoing embodiments may be implemented individually or in any combination.

What is claimed is:

1. An electronic device comprising:

a display;

a housing wall opposite the display;

a sidewall that couples the housing wall to the display, wherein the sidewall includes an aperture; and an antenna panel aligned with the aperture and configured to radiate radio-frequency signals through the sidewall via the aperture, wherein the antenna panel is tilted towards the housing wall at a non-zero angle with respect to the sidewall.

2. The electronic device of claim 1, wherein the non-zero angle is between 5 degrees and 25 degrees.

3. The electronic device of claim 2, wherein the non-zero angle is between 10 degrees and 20 degrees.

4. The electronic device of claim 3, wherein the non-zero angle is 15 degrees.

5. The electronic device of claim 1, wherein the antenna panel comprises:

a substrate having a lateral surface tilted at the non-zero angle with respect to the sidewall; and at least one antenna on the substrate.

6. The electronic device of claim 5, wherein the at least one antenna comprises a phased antenna array and the radio-frequency signals are at a frequency greater than 10 GHz.

7. The electronic device of claim 1, wherein the aperture comprises a segment extending along a longitudinal axis and the sidewall comprises an antenna window having peripheral edges extending parallel to the longitudinal axis.

8. The electronic device of claim 1, wherein the aperture comprises a first segment extending along a first longitudinal axis and a second segment extending along a second longitudinal axis oriented at a non-parallel angle with respect to the first longitudinal axis.

9. The electronic device of claim 8, wherein the first segment and the second segment comprise injection-molded plastic, the antenna panel being mounted to the injection-molded plastic of the second segment.

10. The electronic device of claim 1, further comprising:

an additional sidewall that couples the housing wall to the display, wherein the additional sidewall has an additional aperture, the additional sidewall extending away from the display parallel to the sidewall; and an additional antenna panel aligned with the additional aperture and configured to radiate additional radio-frequency signals through the additional sidewall via the additional aperture, wherein the additional antenna panel is tilted towards the housing wall at an additional non-zero angle with respect to the additional sidewall.

11. The electronic device of claim 10, wherein the additional non-zero angle and the non-zero angle have a same magnitude.

12. The electronic device of claim 11, wherein the additional non-zero angle and the non-zero angle have opposite signs.

13. The electronic device of claim 1, wherein the antenna panel has a lateral surface tilted at the non-zero angle with respect to an exterior surface of the sidewall.

14. The electronic device of claim 1, further comprising: an additional sidewall that couples the housing wall to the display and that extends away from the display in parallel with the sidewall.

15. The electronic device of claim 14, wherein the additional sidewall includes an additional aperture.

16. The electronic device of claim 15, further comprising: a first additional antenna panel aligned with the additional aperture and configured to radiate radio-frequency signals through the additional sidewall via the additional aperture, wherein the first additional antenna panel is tilted towards the housing wall at an additional non-zero angle with respect to the additional sidewall.

17. The electronic device of claim 16, further comprising: a second additional antenna panel overlapping the display and configured to radiate radio-frequency signals through a dielectric cover layer of the display.

18. The electronic device of claim 15, further comprising: a substrate having a lateral surface tilted at an additional non-zero angle with respect to an exterior surface of the additional sidewall; and a phased antenna array on the substrate and configured to convey radio-frequency signals through the additional aperture.

19. The electronic device of claim 1, further comprising: an additional antenna panel overlapping the display and configured to radiate radio-frequency signals through the display.

20. The electronic device of claim 1, wherein the sidewall comprises a conductive sidewall having the aperture and the housing wall comprises a conductive housing wall.

* * * * *